Feb. 13, 1962  C. PANTERMOLLER  3,020,824
COOKING APPARATUS
Filed April 27, 1959
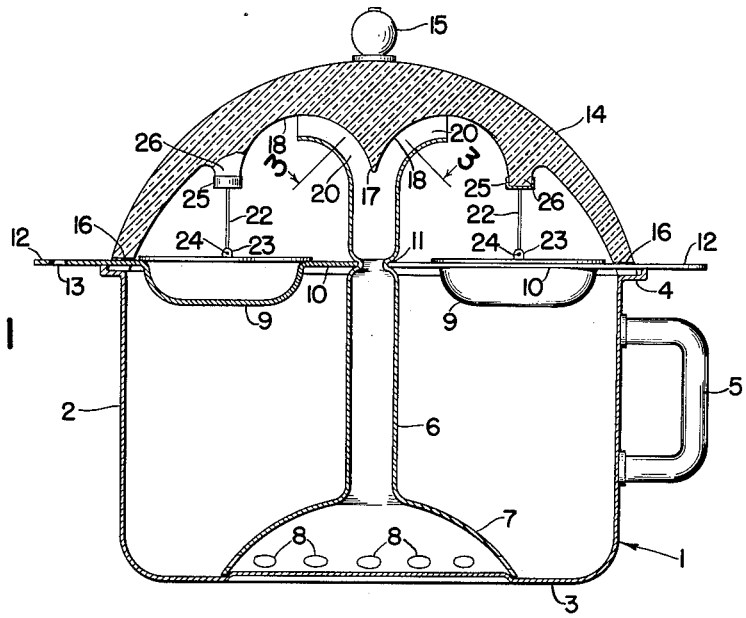
FIG. I
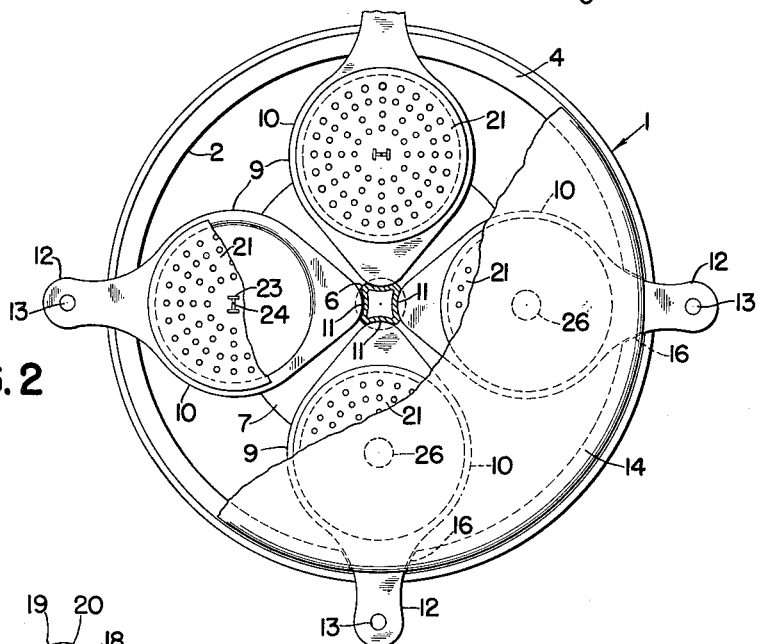
FIG. 2
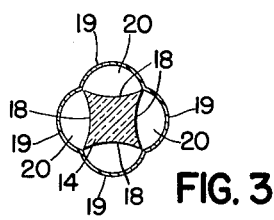
FIG. 3
*INVENTOR.*
CARL PANTERMOLLER
BY
Attorneys

United States Patent Office 3,020,824
Patented Feb. 13, 1962

3,020,824
COOKING APPARATUS
Carl Pantermoller, 2844 S. Herman St., Milwaukee, Wis.
Filed Apr. 27, 1959, Ser. No. 809,245
6 Claims. (Cl. 99—346)

This invention relates to a cooking apparatus and more particularly to a device for poaching eggs.

Eggs are normally poached by dropping the egg into boiling water. In many cases, the egg white tends to separate from the yolk or becomes stringy which presents difficulties in removing the cooked eggs from the water. To overcome these difficulties, devices have been employed in which the egg is placed in a cup which is suspended within a pan containing water. However, eggs cooked in this manner are basically steamed eggs and lack the flavor of an egg which is cooked in contact with hot or boiling water.

The present invention is directed to an apparatus for poaching eggs in which boiling water is circulated over the eggs in a percolating type of action. More specifically, the apparatus includes a container which is adapted to contain water which is to be heated on a stove or the like. A central tube or riser is disposed within the container and a plurality of egg cups are supported by the riser and are provided with handles which extend outwardly and rest on the upper edge of the container. Boiling water travels upwardly within the riser and is deflected by the cover onto each cup. To uniformly distribute the water onto each egg, the egg cups are provided with perforated lids. The excess water drains from each egg cup back to the bottom of the container and is recirculated.

The apparatus of the invention improves the flavor of the cooked eggs over that in which steam is employed as the cooking medium, for the eggs are contacted by the heated water to which salt or other seasoning can be added.

The combination of the perforated lid and the contoured top of the container serves to uniformly distribute the boiling water over the eggs contained within the cups to insure a uniform rate of cooking.

Each of the egg cups associated with the container is individually removable so that one or a number of eggs can be cooked simultaneously and each egg can be removed to obtain the desired degree of hardness.

As the perforated lid for each egg cup is connected to the cover, the removal of the cover will automatically lift the lids from the cups so that the eggs can be readily seen.

In addition, the present device incorporates an automatic feature for aligning the egg cups and the cover with the central riser or tube so that proper alignment of the egg cups within the container is assured.

Other objects and advantages will appear in the course of the following description.

The drawings illustrate the best mode presently contemplated of carrying out the invention.

In the drawings:

FIGURE 1 is a vertical section of the cooking apparatus of the invention;

FIGURE 2 is a top plan view with parts broken away in section; and

FIGURE 3 is a horizontal section taken along line 3—3 of FIGURE 1.

The drawings illustrate a cooking apparatus and more particularly an apparatus for poaching eggs by a percolating type of action. The apparatus includes a container 1 which is provided with a generally cylindrical side wall 2 and a bottom 3. The upper edge of the side wall 2 is formed with an outwardly extending flange 4.

To facilitate lifting of the container, a handle 5 is secured to the outer surface of the side wall 2.

The container 1 is adapted to contain water which is heated by placing the container 1 on a gas burner, hot plate, stove or the like.

In order to circulate the boiling water upwardly within the container, a tubular riser 6 is disposed centrally of the container and is provided with a generally convex base 7. The base is provided with a plurality of holes 8 through which the boiling water enters and the water is then conducted upwardly within the riser 6 to the top of the container.

The eggs to be cooked are contained in a plurality of egg cups 9 which are provided with a peripheral rim 10. To support the cups 9, the inner edge of the rim 10 rests on a notch or shoulder 11 formed in the riser 6. As shown in the drawings, there are four egg cups 9 and the riser 6 is provided with a corresponding number of notches 11 which support the rims of the egg cups.

The egg cups 9 are also provided with handles 12 which extend outwardly from the respective rims 10. Each handle is provided with an opening 13 which serves to increase the rate of heat transfer from the cup 9 to the atmosphere.

The container 1 is enclosed by a generally convex cover 14 which rests on the flange 4 of the container 1. The cover may be formed of metal, glass or the like, and is provided with a knob 15 to facilitate removal of the cover from the container.

To insure alignment of the cover 14 with the cup 9, the lower peripheral edge of the cover is provided with a series of slots 16 which receive the handles 12 of the cups 9. The handles of the cups rest on the upper edge of the flange 4 and extend within the slots 16 to thereby prevent movement of the cups in both horizontal and vertical planes.

The boiling water rising within riser 6 is deflected radially toward the cups 9 by an apex 17 which is formed centrally within the cover 14. The apex divides the inner surface of the cover 14 into four arched or vaulted surfaces 18 corresponding to the cups 9. In addition, the riser 6 is provided with a corresponding number of flared surfaces 19 so that the flared surfaces 19 serve to define passages 20 in combination with the arched surfaces 18 to further direct the boiling water toward the egg cups 9. Thus, the boiling water passing upwardly within the riser 6 will flow within the passages 20 and then along the arched surfaces 18 into contact with the eggs within the cups 9.

To distribute the heated water uniformly over the surface of the eggs, a perforated lid 21 is disposed on each of the cups 9. The lids 21 are supported by rods 22 which are secured to lugs 23 on the upper surface of the lids by pins 24. The upper end of each rod 22 is secured by connector 25 to a boss 26 formed in the cover 14. With this construction, the lids 21 will be lifted upwardly from the respective cups 9 when the cover 14 is removed from the container. Thus, when it is desired to view the amount of cooking to which the eggs have been subjected, the cover 14 is raised and the lids 21 will be lifted from the egg cups 9.

The combination of the notches 11 in riser 6 and the slots 16 in cover 14 insure that the flared surfaces 19 of the riser are in proper alignment with the arched surfaces 18 in the cover. For example, when inserting the egg cups, the tip of the rim 10 is rested on the respective notch 11. The cover 14 must then be placed on the container so that the handles of the egg cups 9 fit within the slots 16. This insures that the cover is properly aligned and that surfaces 18 and 19 are in alignment.

In operation, the water in the container 1 is boiled by any convenient heating means and the boiling water passes upwardly within the riser, through passages 20, and is deflected by the curved surfaces 18 of the cover onto the perforated plates 21. The water then passes through the perforations in the plates 21 into contact with the eggs within the cups 9. The excess water drains from the peripheral edges of the rim 10 back down to the bottom of the container and is recirculated.

With this construction, the eggs are contacted with heated or boiling water which enhances the flavor of the cooked eggs. Furthermore, the perforated lid, in combination with the arched surfaces of the cover, provides a uniform distribution of the heated water onto the surface of the eggs.

Each of the egg cups 9 is individually removable from the container so that the eggs in the cups can be cooked to any degree of hardness.

Various modes of carrying out the invention are contemplated as being within the scope of the following claims particularly pointing out and distinctly claiming the subject matter which is regarded as the invention.

I claim:

1. A cooking apparatus, comprising an open top container having an upper peripheral edge and adapted to contain water to be heated, a riser disposed centrally within the container and adapted to conduct heated water from the lower portion of the container to the upper portion thereof, abutment means connected to said riser at a vertical level corresponding to said peripheral edge, a series of separate egg cups disposed in circularly spaced relation within the container and adapted to contain eggs to be cooked, each of said egg cups having a rim with a portion of said rim disposed to engage said abutment means and a second portion of said rim being disposed to rest on said peripheral edge of the container whereby said egg cup is supported between said riser and said peripheral edge of the container, and a cover to enclose the upper end of the container, said cover being provided with a central downwardly extending apex disposed in vertical alignment with the riser and being provided with a series of arched surfaces extending radially from said apex and corresponding in number and alignment with said egg cups, said arched surfaces deflecting the heated water being discharged from the upper end of said riser to the respective egg cups and into contact with the eggs therein.

2. The structure of claim 1 and including means for preventing vertical and horizontal displacement of the cups with respect to said container.

3. The structure of claim 1 in which the upper end of the riser is provided with outwardly flared surfaces disposed in alignment with said arched surfaces and defining passages for the heated water with the corresponding arched surfaces.

4. A cooking apparatus, comprising an open top container having an upper peripheral edge and adapted to contain water to be heated, a riser disposed centrally within the container and adapted to conduct heated water from the lower portion of the container to the upper portion thereof, a series of ledges formed on said riser and disposed in a generally horizontal plane, a series of separate egg cups disposed in circularly spaced relation within the container and adapted to contain eggs to be cooked, each of said egg cups having a rim with a portion of said rim disposed to engage one of said ledges and having a handle extending outwardly beyond the container and disposed to rest on said peripheral edge whereby said egg cup is supported between said riser and said peripheral edge of the container, a cover to enclose the upper end of the container, said cover being provided with a central downwardly extending apex disposed in vertical alignment with the riser and being provided with a series of arched surfaces extending radially from said apex and corresponding in number and alignment with said egg cups, said arched surfaces deflecting the heated water being discharged from the upper end of said riser to the respective egg cups and into contact with the eggs therein, and said cover having a series of recesses formed in the lower edge thereof to receive the handles of the egg cups and disposed in alignment with the respective ledges on said riser, said recesses serving to align the cover with respect to the cups and riser and serving to prevent displacement of the cups.

5. A cooking apparatus, comprising an open top container having an upper peripheral edge and adapted to contain water to be heated, a riser disposed centrally within the container and adapted to conduct heated water from the lower portion of the container to the upper portion thereof, abutment means connected to said riser at a vertical level corresponding to said peripheral edge, a series of separate egg cups disposed in circularly spaced relation within the container and adapted to contain eggs to be cooked, each of said egg cups having a rim with a portion of said rim disposed to engage said abutment means and a second portion of said rim being disposed to rest on said peripheral edge of the container whereby said egg cup is supported between said riser and said peripheral edge of the container, a cover to enclose the upper end of the container, said cover being provided with a central downwardly extending apex disposed in vertical alignment with the riser and being provided with a series of arched surfaces extending radially from said apex and corresponding in number and alignment with said egg cups, said arched surfaces deflecting the heated water being discharged from the upper end of said riser to the respective egg cups and into contact with the eggs therein, and means for maintaining radial alignment of the cover with respect to the cups and riser.

6. A cooking apparatus, comprising an open top container having an upper peripheral edge and adapted to contain water to be heated, a riser disposed centrally within the container and adapted to conduct heated water from the lower portion of the container to the upper portion thereof, abutment means connected to said riser at a vertical level corresponding to said peripheral edge, a series of separate egg cups disposed in circularly spaced relation within the container and adapted to contain eggs to be cooked, each of said egg cups having a rim with a portion of said rim disposed to engage said abutment means and a second portion of said rim being disposed to rest on said peripheral edge of the container whereby said egg cup is supported between said riser and said peripheral edge of the container, a perforated lid disposed on each cup, a cover to enclose the upper end of the container, said cover being provided with a central downwardly extending apex disposed in vertical alignment with the riser and being provided with a series of arched surfaces extending radially from said apex and corresponding in number and alignment with said egg cups, the upper end of said riser being provided with outwardly flared surfaces disposed in alignment with said arched surfaces and defining passages for the heated water with the corresponding arched surfaces, whereby the heated water being discharged from said riser passes through said passages and to said cups with said perforated lids serving to uniformly distribute the heated water onto the eggs in the cups, and means for supporting the lid from the cover whereby the lid will be lifted from the cup when the cover is raised.

References Cited in the file of this patent

UNITED STATES PATENTS

| | | |
|---|---|---|
| 2,010,915 | Carpenter | Aug. 13, 1935 |
| 2,088,462 | Buffum | July 27, 1937 |
| 2,232,400 | Martin | Feb. 18, 1941 |
| 2,618,219 | Hummel | Nov. 18, 1952 |
| 2,866,401 | Sidell | Dec. 30, 1958 |

FOREIGN PATENTS

| | | |
|---|---|---|
| 1,122,397 | France | May 22, 1956 |